(12) United States Patent
Sung

(10) Patent No.: US 7,143,751 B2
(45) Date of Patent: Dec. 5, 2006

(54) AIR INTAKE APPARATUS FOR AIR FILTER OF CANISTER

(75) Inventor: Yeoun Kwan Sung, Suwon (KR)

(73) Assignee: Hyundai Motor Company, Seoul (KR)

(*) Notice: Subject to any disclaimer, the term of this patent is extended or adjusted under 35 U.S.C. 154(b) by 54 days.

(21) Appl. No.: 11/203,448

(22) Filed: Aug. 12, 2005

(65) Prior Publication Data

US 2006/0032482 A1    Feb. 16, 2006

(30) Foreign Application Priority Data

Aug. 13, 2004  (KR) .................... 10-2004-0063700

(51) Int. Cl.
*F02M 33/02* (2006.01)
*F02M 33/04* (2006.01)
(52) U.S. Cl. .................................... 123/519
(58) Field of Classification Search ............... 123/518, 123/519, 516, 198 D; 137/587
See application file for complete search history.

(56) References Cited

U.S. PATENT DOCUMENTS

| | | | | |
|---|---|---|---|---|
| 4,659,346 A | * | 4/1987 | Uranishi et al. | 96/109 |
| 4,836,835 A | * | 6/1989 | Harris et al. | 96/113 |
| 5,054,528 A | * | 10/1991 | Saitoh | 141/59 |
| 5,263,511 A | * | 11/1993 | Ohasi et al. | 137/588 |
| 5,327,934 A | * | 7/1994 | Thompson | 137/588 |
| 5,474,048 A | * | 12/1995 | Yamazaki et al. | 123/519 |
| 5,819,796 A | * | 10/1998 | Kunimitsu et al. | 137/587 |
| 6,308,692 B1 | * | 10/2001 | Ishikawa et al. | 123/519 |
| 2003/0131655 A1 | * | 7/2003 | Miyahara et al. | 73/37 |

* cited by examiner

*Primary Examiner*—Mahmoud Gimie
(74) *Attorney, Agent, or Firm*—Morgan Lewis & Bockius LLP

(57) ABSTRACT

An air intake apparatus used for a canister of a fuel system includes a device and system to prevent the accumulation of dust and/or foreign substances from building up in the air filter. An air intake hole, for supplying air to an air filter used for a canister, is positioned in a fuel inlet space.

1 Claim, 3 Drawing Sheets

AIR INTAKE APPARATUS FOR AIR FILTER OF CANISTER

CROSS REFERENCE TO RELATED PATENT APPLICATION

This application claims priority to and the benefit of Korean Patent Application No. 10-2004-0063700 filed in the Korean Intellectual Property Office on Aug. 13, 2004, the entire content of which is incorporated herein by reference.

FIELD OF THE INVENTION

Generally, the present invention relates to an air intake apparatus for an air filter of a canister. More particularly, the present invention relates to an air intake apparatus for the air filter of a canister that can minimize accumulation of dust or foreign substances in the air filter.

BACKGROUND OF THE INVENTION

As is well known in the art, a canister is disposed to a side of a fuel tank such that an inner pressure by a fuel gas generated in the fuel tank can be controlled. In a case that the canister or the like does not exist, the inner pressure of the tank may rise because of the fuel gas, consumption of fuel increases, and air pollution can occur as a result of gas leakage.

Typically, a filler pipe for supplying fuel to a fuel tank is connected to one side of the fuel tank. A filler neck for accommodating a gasoline pump nozzle to be being inserted therein is formed to an upper end of the filler pipe. One end of the filler neck protrudes into a fuel inlet space formed between a vehicle body and a fuel cap door such that the end of the filler neck is opened/closed by a fuel cap. In addition, the filler neck and the fuel tank are connected by a leveling pipe. The leveling pipe is typically for controlling an amount of fuel delivered to the fuel tank, depending on a pressure of the fuel supplied to the fuel tank during a fuel supplying process.

An upper portion of the fuel tank and a canister are connected with each other by a fuel evaporation gas line. The fuel evaporation gas generated in the fuel tank flows into the canister through the fuel evaporation gas line. The fuel evaporation gas flows into the canister in a state where an engine stops is captured by activated carbon in the canister. A fuel element in the canister is purged into an intake system of the engine through the purge line by an opening operation of a purge control valve when the engine is operating.

An end of an air passage is connected to the canister such that the purge operation is more easily done in the canister and another end of the air passage is connected to an air filter located to one side of the filler neck. The air filter is intended to eliminate foreign substances mixed in the air supplied to the canister.

On the other hand, the air passage and the air filter are also utilized as passages such that an inner pressure of the canister is lowered during a situation where the inner pressure of the fuel tank and the canister is excessively high. However, when a vehicle, having the fuel system as described above, drives in poor road conditions, such as on an unpaved road, the air filter can become plugged because foreign substances, such as dust or dirt, can accumulate in the air filter.

Also, if the fuel evaporation gas is purged when the air filter is plugged by foreign substances, a pressure developed in the intake system can excessively affect the canister and the fuel tank, thereby potentially causing deformation or cracks of the fuel tank.

The information disclosed in this Background of the Invention section is only for enhancement of understanding of the background of the invention, and therefore, unless explicitly described to the contrary, it should not be taken as an acknowledgement or any form of suggestion that this information forms the prior art that is already known in this country to a person of ordinary skill in the art.

SUMMARY OF THE INVENTION

The present invention provides an air intake apparatus having advantages of minimizing accumulation of dust or foreign substance in the air filter. An exemplary air intake apparatus according to an embodiment of the present invention includes an air passage communicating with an air filter for a canister used for a fuel storage device that includes a filler neck installed to a vehicle body, such that one end thereof protrudes into a fuel inlet space formed between the vehicle body and a fuel cap door.

The filler neck includes an inner pipe defining an fuel supply passage and an outer pipe surrounding at least a portion of the inner pipe such that an air intake space is formed between an outer surface of the inner pipe and the outer pipe. The inner pipe and outer pipe are formed such that the fuel inlet space and the air intake space can communicate with each other. The air filter and the air intake space are in communication with each other by an air supply pipe such that air in the fuel inlet space can flow to the air filter via the air intake space.

The ends of the inner pipe and the outer pipe are respectively formed to protrude into the fuel inlet space. An end of the outer pipe protrudes into the fuel inlet space a shorter distance than a length of an end of the inner pipe that protrudes into the fuel inlet space, such that the air intake space can communicate with the fuel inlet space in a state that a fuel cap is mounted to the inner pipe. An air intake hole for communicating the fuel inlet space with the air intake space is formed toward the end of the outer pipe that protrudes into the fuel inlet space.

BRIEF DESCRIPTION OF THE DRAWINGS

The accompanying drawings illustrate exemplary embodiments of the present invention, and, taken together with the description, serve to explain the principles of the present invention, wherein.

DETAILED DESCRIPTION OF THE EMBODIMENTS

Figure 1:
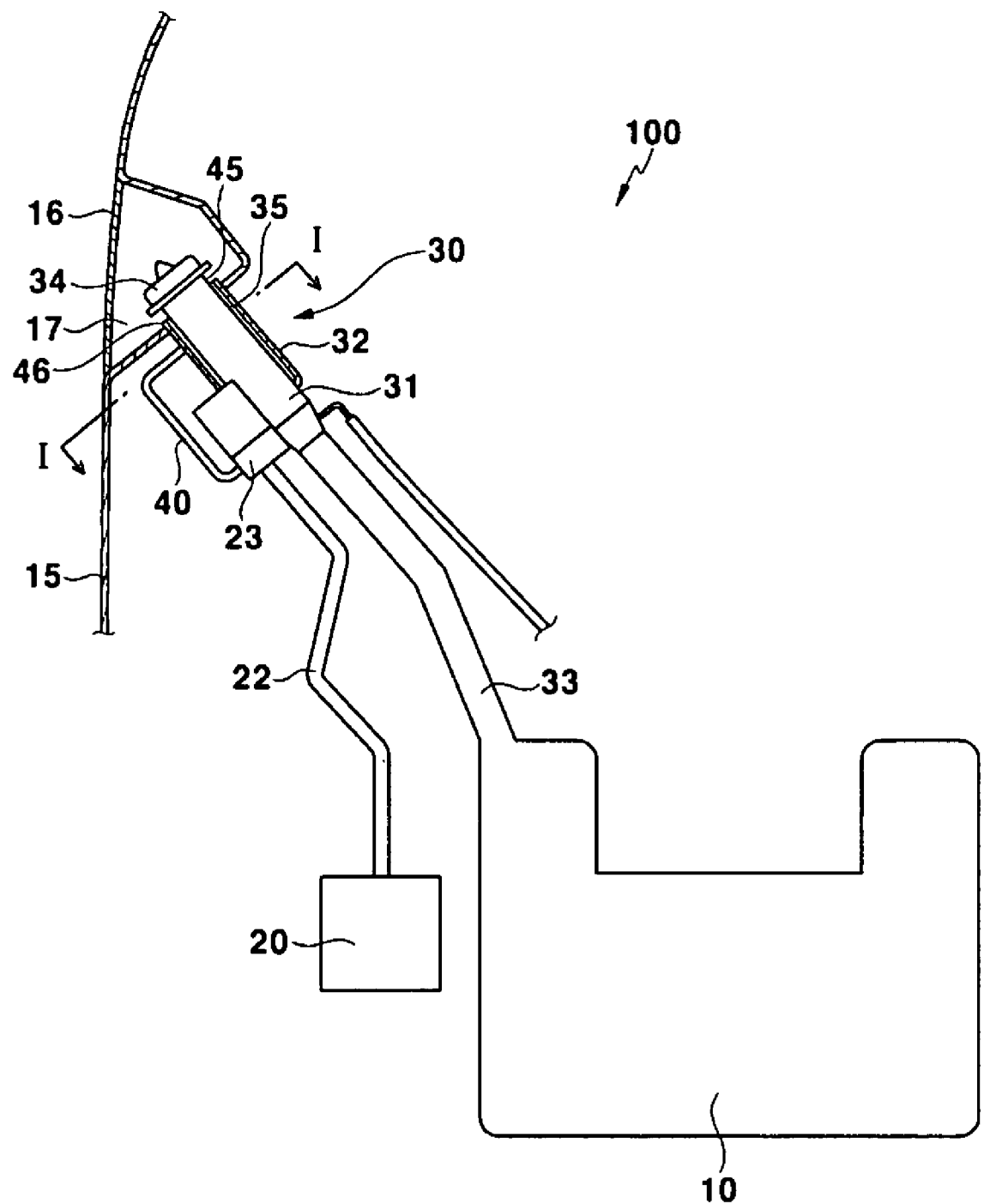
FIG. 1 is a schematic drawing showing an air intake apparatus for supplying air to an air filter of a canister according to an embodiment of the present invention.

Referring to FIG. 1, an air intake apparatus used in a fuel storage device 100 includes a filler neck 30 installed to a vehicle body 15 such that one end thereof protrudes into a fuel inlet space 17 formed between the vehicle body 15 and a fuel cap door 16. The fuel storage device 100 also includes an air passage 22 in communication with an air filter 23 for a canister 20. The filler neck 30 includes an inner pipe 31 and an outer pipe 32.

The inner pipe 31 defines a fuel supply passage 33. The outer pipe 32 surrounds at least a portion of the inner pipe 31 such that an air intake space 35 can be formed between an outer surface 50 (FIG. 2) of the inner pipe 31 and the outer pipe 32. That is, the fuel cap 34 is disposed to an upper end 45 of the inner pipe 31, and an upper end 46 of the outer pipe 32 is formed to be communicated with the fuel inlet space 17.

During fueling of the vehicle, a gasoline pump nozzle for supplying the fuel is inserted into the inner pipe 31. The inner pipe 31 and outer pipe 32 are formed such that the fuel inlet space 17 and the air intake space 35 are in communication with each other. The air filter 23 and the air intake space 35 are in communication with each other by an air supply pipe 40 such that air in the fuel inlet space 17 can flow to the air filter 23 via the air intake space 35.

A lower portion of the outer pipe 32 is fixed on an outer surface 50 of the inner pipe 31. The air intake space 35 is formed between the inner pipe 31 and the outer pipe 32 by a difference between a diameter of the inner pipe 31 and a diameter of the outer pipe 32, and the air intake space 35 is communicated with the fuel inlet space 17. In addition, the upper ends 45 and 46 are respectively formed to protrude into the fuel inlet space 17.

Figure 2:
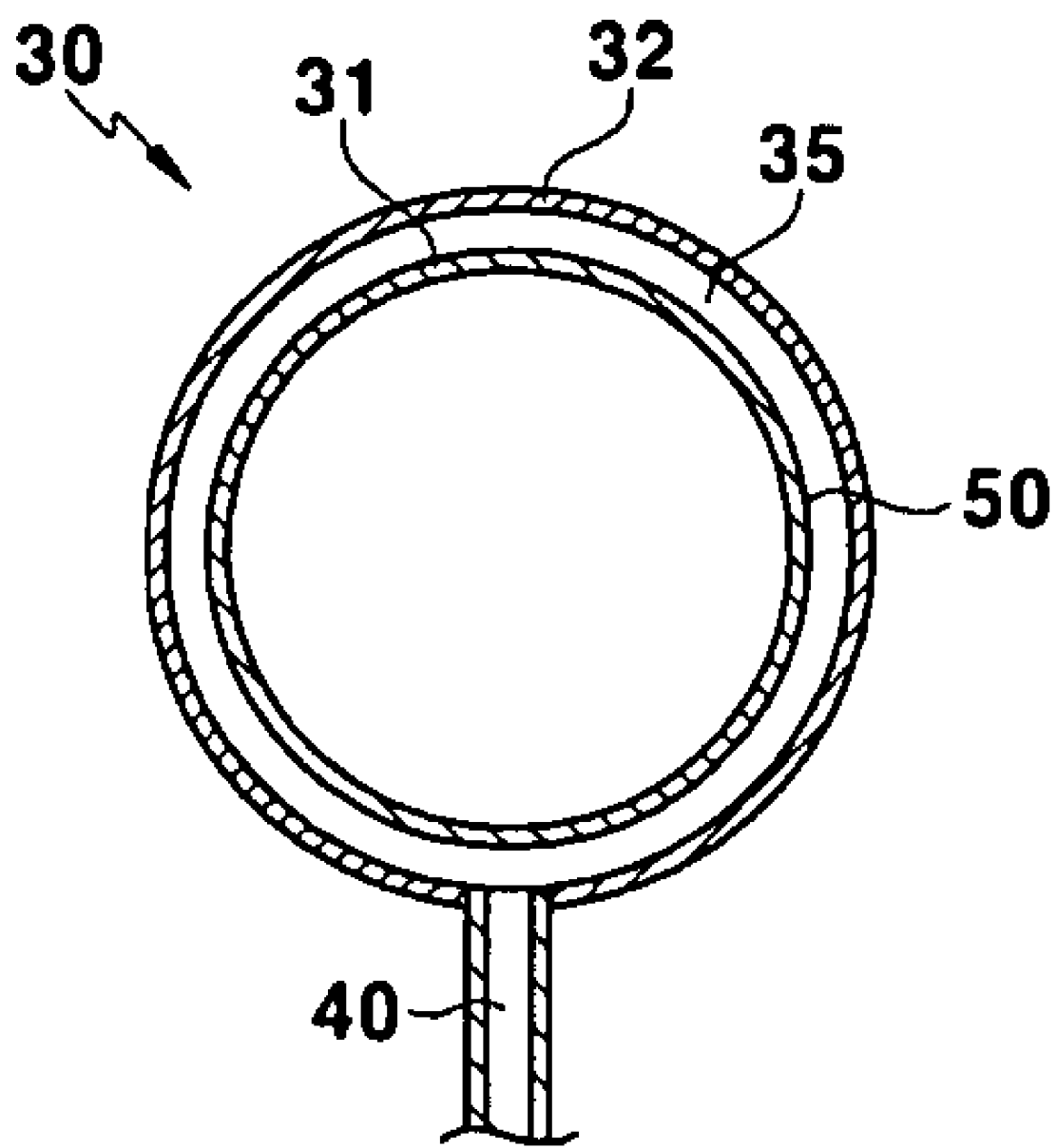
FIG. 2 is a sectional view taken along a line I-I of FIG. 1 according to an embodiment of the present invention.

Referring to the FIG. 2, the diameter of the inner pipe 31 is smaller than the diameter of the outer pipe 32, and the air intake space 35 is formed between the inner pipe 31 and the outer pipe 32. In addition, the air supply pipe 40 is connected to the outside of the outer pipe 32.

A length of the end 46 of the outer pipe 32 protruding into the fuel inlet space 17 is shorter than a length of the end 45 of the inner pipe 31 protruding into the fuel inlet space 17, such that the air intake space 35 can communicate with the fuel inlet space 17 when the fuel cap 34 is mounted to the inner pipe 31. That is, in order to communicate the air intake space 35 with the fuel inlet space 17, the end 46 of the outer pipe 32 is formed to have a lower height than the end 45 of the inner pipe 31. Therefore, in spite of the fuel cap 34 closing the inner pipe 31, air can flow into the air intake space 35.

Figure 3:
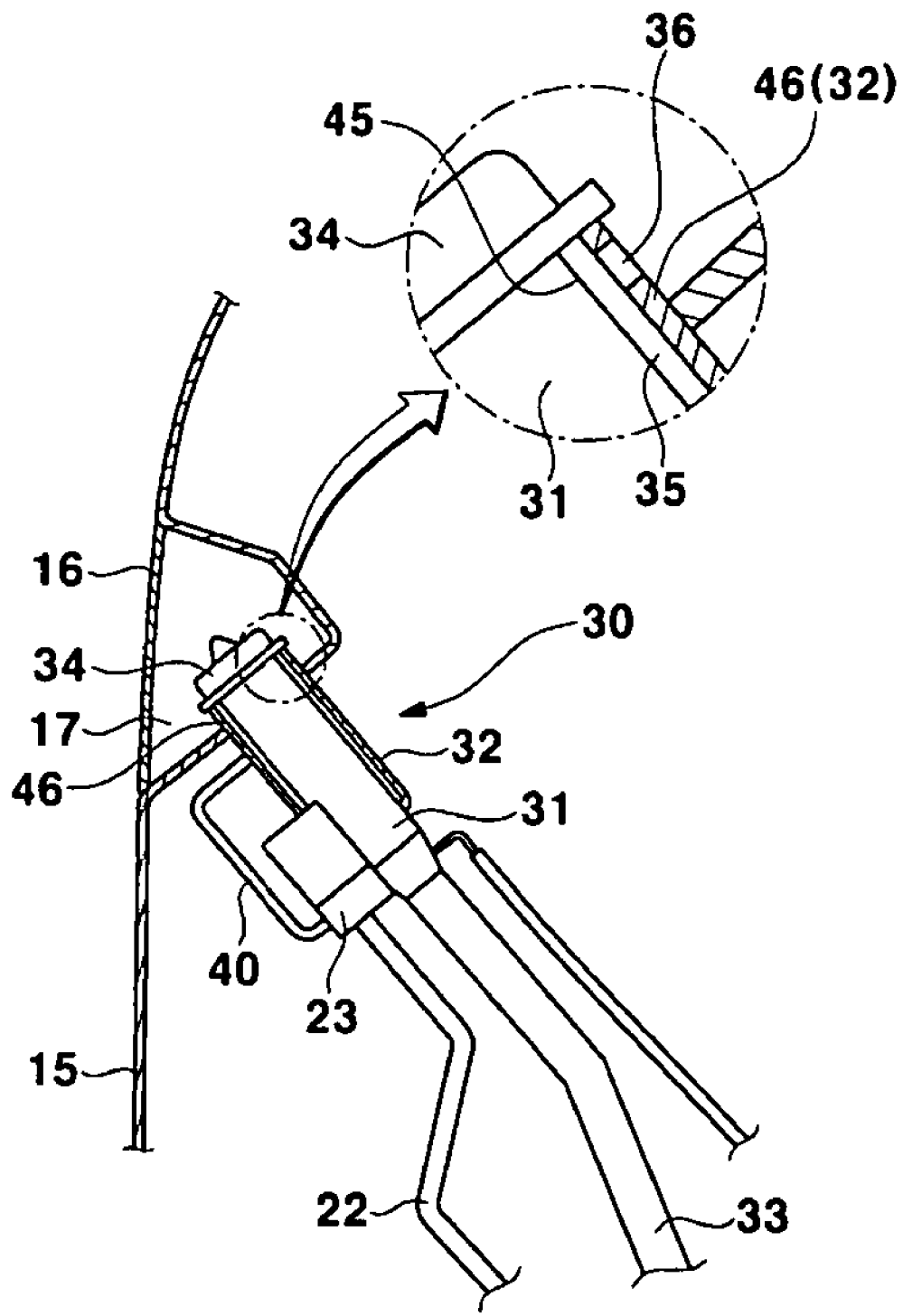
FIG. 3 is a schematic view showing an air intake apparatus according to another embodiment of the present invention.

As shown in FIG. 3, according to another embodiment of the present invention, an air intake hole 36 can be formed toward the end 46 of the outer pipe 32 that protrudes into the fuel inlet space 17, such that the fuel inlet space 17 is communicated with the air Intake space 35. An upper portion of the air supply pipe 40 is communicated with the air intake space 35, and a lower portion of the air supply pipe 40 is communicated with an intake side of the air filter 23.

In consideration of a layout of the fuel inlet space 17, the air supply pipe 40 may be located only inside of the vehicle body 15. The fuel inlet space 17 is formed to be able to be opened or closed by a fuel cap door 16 as in a prior art. Because the fuel inlet space 17 is partially isolated from the outside of a vehicle body 15 by the vehicle body 15 and fuel cap door 16, air that is more pure than air outside of the vehicle body 15 flows into the air intake space 35. The air that flows into the air intake space 35 is supplied to the air filter 23 through the air supply pipe 40, and then the air is purified in the air filter 23 and supplied to the canister 20.

On the other hand, when the fuel is supplied, the fuel supplier opens the fuel cap door 16, removes the fuel cap 34, and then inserts a gas pump nozzle into the inner pipe 31 and supplies the fuel. As the fuel is being supplied into the inner pipe it flows into the fuel tank 10 through a filler tube 33. At that time, because the inner pipe 31 is separated from the outer pipe 32, the fuel cannot flow into the air intake space 35.

As described, according to an embodiment of the present invention, because air in the fuel inlet space is partially isolated from the outside, by the vehicle body and the fuel cap door, first flows into the air intake space and then into the air filter through the air supply pipe, air that is more pure than air outside of the vehicle body flows into the canister. Thus, a case where the air filter becomes plugged by foreign substances can be reduced.

While this invention has been described in connection with what is presently considered to be the best practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An air intake apparatus has an air passage in communication with an air filter for a canister used for a fuel storage device and a filler neck installed to a vehicle body such that one end thereof protrudes into a fuel inlet space formed between the vehicle body and a fuel cap door, wherein the filler neck comprises:

an inner pipe defining a fuel supply passage; and an outer pipe surrounding at least a portion of the inner pipe such that an air intake space is formed between an outer surface of the inner pipe and the outer pipe;

wherein the inner pipe and the outer pipe are formed such that a fuel inlet space and the air intake space are in communication with each other;

wherein an air filter and the air intake space are in communication with each other by an air supply pipe such that air in the fuel inlet space can flow to the air filter via the air intake space;

wherein an end of the inner pipe and an end of the outer pipe protrude into the fuel inlet space; and wherein a length of the end of the outer pipe protruding into the fuel inlet space is shorter than a length of the end of the inner pipe protruding into the fuel inlet space such that the air intake space can communicate with the fuel inlet space in a state that a fuel cap is mounted to the inner pipe.

* * * * *